Patented Nov. 17, 1942

2,301,952

UNITED STATES PATENT OFFICE 2,301,952

CONDENSATION PRODUCTS OF 1- AND 2-CHLOROPROPENE-1 AND PROCESS OF PRODUCING SAME

Helmut Jacobi and Walter Flemming, Ludwigshafen-on-the-Rhine, Germany; vested in the Alien Property Custodian No Drawing. Application June 27, 1939, Serial No. 281,354. In Germany July 7, 1938

3 Claims. (Cl. 260—80)

The present invention relates to new condensation products of 1- and 2-chlorpropene-1 and a process of producing same.

We have found that valuable condensation products are obtained by the condensation of 1- or 2-chlorpropene-1 with acid reacting inorganic halides having a condensing action, such as aluminum chloride, iron chloride and boron fluoride. During the reaction hydrogen chloride is split off. The condensation is preferably carried out in an inert solvent, as for example carbon tetrachloride, paraffin hydrocarbons or carbon disulphide.

The condensation products are more or less viscous oils which have drying properties and may be used in the same way as vegetable drying oils. Their speed of drying can be increased by the addition of known siccatives. They may also be heated with resins and other substances used for lacquer purposes. They are suitable for the preparation of coatings, for example on wood or metal, as binding agents for floor coverings and as impregnating agents.

It has already been proposed to heat chlorpropene in the presence of hydrochloric acid under pressure, whereby polymerization takes place. As contrasted with the process described above, however, there is no splitting off of hydrogen chloride in the said polymerization and therefore different final products are obtained.

Trichlorethylene and other highly halogenated unsaturated aliphatic hydrocarbons have already been treated with aluminum chloride; products are thus obtained which, in contrast to the products of the present invention, do not dry but yield solid resins when heated.

The following examples will further illustrate how our present invention may be carried out in practice, but the invention is not restricted to these examples. The parts are by weight.

Example 1

200 parts of 1-chlorpropene-1 are added in small portions during the course of an hour while continuously stirring to a suspension of 50 parts of dry aluminum chloride in 500 parts of carbon tetrachloride. The heating which occurs is mitigated to such an extent by cooling with ice-water that a uniform boiling under reflux takes place. When the whole of the chlorpropene has been added, the whole is stirred without further cooling until the mixture has reached about room temperature. 320 parts of carbon tetrachloride, further ice-water and dilute hydrochloric acid are then added. The carbon tetrachloride solution which thus separates is washed twice with dilute hydrochloric acid, twice with water and finally with sodium bicarbonate solution. It is then allowed to run through a suction filter which is about two-thirds filled with anhydrous soda.

The entirely clear, pale-brown solution thus obtained is freed from carbon tetrachloride under reduced pressure and in an atmosphere of nitrogen. There remain 80 parts of a brown, clear, viscous oil having an iodine value of 208. In a thin layer, the oil dries without the addition of driers to give a well-adhering film within a short time.

By using carbon disulphide instead of carbon tetrachloride, about the same yield is obtained under otherwise identical conditions.

Example 2

200 parts of 1-chlorproprene-1 are added with 20 parts of aluminum chloride in small portions. The reaction vessel is cooled so that the temperature does not exceed 35° C. When hydrogen chloride is no longer split off, the mixture is kept at 35° C. for 1 hour, then poured into water, washed with hydrochloric acid to remove the aluminum salt, then washed with sodium hydroxide solution and finally with water and dried by means of anhydrous calcium chloride. After distilling off the unchanged 1-chlorpropene-1 there remains a brownish thinly-liquid, clear oil which dries to films when exposed in a thin layer to air.

Example 3

Boron fluoride is bubbled through 1-chlorpropene-1 at 35° C. while vigorously stirring. After 2 hours the reaction mixture is poured into water and worked up as described in Example 2. A drying oil which yields excellent films and coatings is thus obtained.

When employing 2-chlorpropene-1 instead of 1-chlorpropene-1 an oil having also good drying properties is obtained.

Example 4

A suspension of 50 parts of aluminum chloride in 500 parts of carbon tetrachloride is added with 200 parts of 2-chlorbuten-1 in small portions within 1 hour while vigorously stirring. Strong evolution of heat takes place. The reaction mixture is boiled for ½ hour under reflux-cooling. After cooling the reaction mixture is worked up as described in Example 2.

An oil having good drying properties is obtained.

What we claim is:

1. A process of producing oily condensation products having drying oil properties, which consists in reacting upon a member selected from the group consisting of 1- and 2-chlorpropene-1 with an acid reacting, inorganic halide, condensing agent.

2. A process as claimed in claim 1 wherein the reaction is effected in the presence of an inert solvent.

3. Oily condensation products which are solely derived from at least one member selected from the group consisting of 1- and 2-chlorpropene-1, said condensation products having drying oil properties.

HELMUT JACOBI.
WALTER FLEMMING.